(12) United States Patent
Ghosh et al.

(10) Patent No.: US 8,738,568 B2
(45) Date of Patent: May 27, 2014

(54) USER-DEFINED PARALLELIZATION IN TRANSACTIONAL REPLICATION OF IN-MEMORY DATABASE

(75) Inventors: Sourav Ghosh, Union City, CA (US); Rohan Aranha, Redwood City, CA (US); Tirthankar Lahiri, Palo Alto, CA (US); Mark McAuliffe, Palo Alto, CA (US); Chih-Ping Wang, Palo Alto, CA (US); Paul Tuck, Swindon (GB); Nagender Bandi, Foster City, CA (US); John E. Miller, Los Altos, CA (US); Dina Thomas, Palo Alto, CA (US); Marie-Anne Neimat, Atherton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 90 days.

(21) Appl. No.: 13/101,783

(22) Filed: May 5, 2011

(65) Prior Publication Data

US 2012/0284228 A1    Nov. 8, 2012

(51) Int. Cl.
*G06F 7/00*        (2006.01)

(52) U.S. Cl.
USPC ......................................................... 707/615

(58) Field of Classification Search
CPC ................................................ G06F 17/30575
USPC .......... 707/615, 609, 612, 614, 634, 999.202, 707/999.201
See application file for complete search history.

(56) References Cited

U.S. PATENT DOCUMENTS

| | | | |
|---|---|---|---|
| 5,170,480 A | 12/1992 | Mohan et al. | |
| 5,530,855 A | 6/1996 | Satoh et al. | |
| 5,734,897 A | 3/1998 | Banks | |
| 5,806,075 A | 9/1998 | Jain et al. | |
| 5,864,851 A | 1/1999 | Breitbart et al. | |
| 5,870,761 A * | 2/1999 | Demers et al. | 1/1 |
| 5,940,839 A | 8/1999 | Chen et al. | |
| 5,950,212 A | 9/1999 | Anderson et al. | |
| 6,163,855 A | 12/2000 | Shrivastava et al. | |
| 6,205,449 B1 | 3/2001 | Rastogi et al. | |
| 6,289,357 B1 | 9/2001 | Parker | |
| 6,304,882 B1 | 10/2001 | Strellis et al. | |
| 6,449,734 B1 | 9/2002 | Shrivastava et al. | |
| 6,526,416 B1 | 2/2003 | Long | |
| 6,647,510 B1 | 11/2003 | Ganesh et al. | |
| 6,823,355 B1 | 11/2004 | Novaes et al. | |
| 6,823,356 B1 | 11/2004 | Novaes et al. | |

(Continued)

OTHER PUBLICATIONS

U.S. Appl. No. 12/719,264, filed Mar. 8, 2010, Office Action, Jan. 19, 2011.

(Continued)

*Primary Examiner* — Hung T Vy
(74) *Attorney, Agent, or Firm* — Hickman Palermo Truong Becker Bingham Wong LLP

(57) ABSTRACT

A replication track is a designated group of transactions that are to be replicated at a destination database in a way that, with respect to any other transaction in the replication track, preserves transactional dependency. Further, transactions in a replication track can be replicated at the destination database without regard to transactional dependency of other transactions in another track. This facilitates concurrent parallel replication of transactions of different tracks. Replicating data in this manner is referred to herein as track replication. An application may request execution of transactions and designate different tracks for transactions.

20 Claims, 2 Drawing Sheets

(56) References Cited

U.S. PATENT DOCUMENTS

| | | |
|---|---|---|
| 6,980,988 B1 | 12/2005 | Demers et al. |
| 7,406,486 B1 | 7/2008 | Kundu et al. |
| 7,548,898 B1 | 6/2009 | Tarenskeen et al. |
| 7,570,451 B2 * | 8/2009 | Bedillion et al. .......... 360/78.05 |
| 7,912,051 B1 * | 3/2011 | Rowlands et al. ............ 370/389 |
| 2002/0109816 A1 | 8/2002 | Ganesh et al. |
| 2004/0122910 A1 | 6/2004 | Douglass et al. |
| 2004/0199552 A1 * | 10/2004 | Ward et al. .................... 707/204 |
| 2006/0010130 A1 * | 1/2006 | Leff et al. ........................ 707/8 |
| 2008/0098044 A1 * | 4/2008 | Todd ............................. 707/202 |
| 2008/0155303 A1 | 6/2008 | Toeroe |
| 2012/0278282 A1 | 11/2012 | Lu et al. |

OTHER PUBLICATIONS

Ng et al., Replicated Transactions, Distributed Computing Transactions, IEEE 9$^{th}$ International Conference, 1989, pp. 474-480.

U.S. Appl. No. 13/094,676, filed Apr. 26, 2011, Office Action, Mar. 13, 2013.

U.S. Appl. No. 13/094,676, filed Apr. 26, 2011, Notice of Allowance, Jul. 12, 2013.

* cited by examiner

USER-DEFINED PARALLELIZATION IN TRANSACTIONAL REPLICATION OF IN-MEMORY DATABASE

CROSS-REFERENCE TO RELATED APPLICATIONS; BENEFIT CLAIM

The present application is related to U.S. patent application Ser. No. 12/030,113, entitled Database System With Dynamic Database Caching, filed by Chi Kim Hoang, et al. on Feb. 12, 2008, the contents of which are incorporated by reference.

The present application is related to U.S. patent application Ser. No. 10/260,547, entitled Method of Applying Changes to A Standby Database System, filed by Alan J. Demers, et al. on Oct. 1, 2002, the contents of which are incorporated by reference.

The present application is related to U.S. patent application Ser. No. 10/120,634, entitled Transforming Transactions To Increase Parallelism When Replicating, filed by Joydip Kundu, et al. on Apr. 10, 2002, the contents of which are incorporated by reference.

The present application is related to U.S. patent application Ser. No. 12/719,264, entitled Automated Integrated High Availability Of The In-Memory Database Cache and the Backend Enterprise Database, filed by Sourav Ghosh, et al. on Mar. 8, 2010, the contents of which are incorporated by reference.

FIELD OF THE INVENTION

The present invention relates to replicating data in database systems.

BACKGROUND

An important feature of a database system is replication. Replication is the process of replicating data from a "source" database server onto another database server, herein referred to as a destination database server. As changes are made to user data on the source database server, the changes are replicated on the destination database server.

Replication is used for many database systems for various purposes. One purpose is availability. The source database server may be a primary database server and the destination database server may be a standby. If the primary database server becomes unavailable, the standby may step in for the primary database server.

Another purpose is to distribute workload between database servers. The source database server may be a primary database server that changes user data, and the destination database server may be a read-only database server that only processes queries. Alternatively, a set of database servers may switch the role of source database server and destination database server for different subsets of data. A first database server may be the primary database server for a first subset of the user data and be the destination database server for a second subset of the user data, receiving changes to the second subset of data to replicate from a second database server. The second database server, as a destination database server, receives changes to the first subset of data to replicate from the first database server.

One approach to replication is the physical replication approach. Under this approach, the changes made to data blocks on the source database of the source database server are made to replicas of those data blocks on a destination database of a destination database server. Because the source database is replicated at the lowest atomic level of storage space on the destination database, the destination database is a physical replica of the source database.

Another approach to replicating data is the logical replication approach. Under the logical replication approach, database commands that modify data on the primary system are in effect re-executed on a logical standby. Re-executing the database commands at the source database server replicates changes at the record level, but not the data block level.

Typically, changes to database systems are made using transaction processing. A transaction is a set of operations that change data. In database systems, the operations are specified by one or more database commands. Committing a transaction refers to making the changes for a transaction permanent.

Under transaction processing, all the changes for a transaction are made atomically. When a transaction is committed, either all changes are committed, or the transaction is rolled back. Because the changes are not permanent until a transaction is committed, the changes for a transaction are not replicated on a logical standby until the transaction is committed on the primary database. After a transaction is committed on the primary database server, the transactions are re-executed and committed on the source database server.

To replicate data on a logical destination database server more quickly and efficiently, transactions may be executed in parallel. Transactions may be executed in parallel by multiple processes, each process executing one of the transactions.

However, the need to preserve transaction dependency between certain transactions greatly impedes the degree or effectiveness of parallism that can be achieved. For example, if a pair of transactions includes operations that modify the same records, then the transactions are not executed in parallel. Instead, the transactions in the pair are executed in serial, with the first transaction to be committed on the primary being executed first. The transactions are serialized under these conditions to ensure that operations to the same records are committed in the same order on the replicated system as they are on the primary database server.

Based on the foregoing, it is clearly desirable to develop an approach that improves parallelism that can be achieved for replicating transactions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details.

General Overview

A replication track is a designated group of transactions that are to be replicated at a destination database in a way that, with respect to any other transaction in the replication track, preserves transactional dependency. Furthermore, transactions in a replication track can be replicated at the destination database without regard to transactional dependency of other transactions in another track. This facilitates concurrent parallel replication of transactions of different tracks. Replicating data in this manner is referred to herein as track replication.

An application may request execution of transactions and designate different tracks for transactions. Given the design, logic and behavior of an application, and/or the structure of a database, some sets of transactions inherently never depend on other sets of transactions. This characteristic may be exploited by developers and administrators, who can program and/or configure an application to designate sets of inherently-independent transactions for different tracks, allowing the transactions to replicated in parallel.

The techniques for track replication are described within the context of a database system. Initially described is an illustrative database system, which is followed by a more detailed description of components and elements used for track replication.

Illustrative Database System

Figure 1:
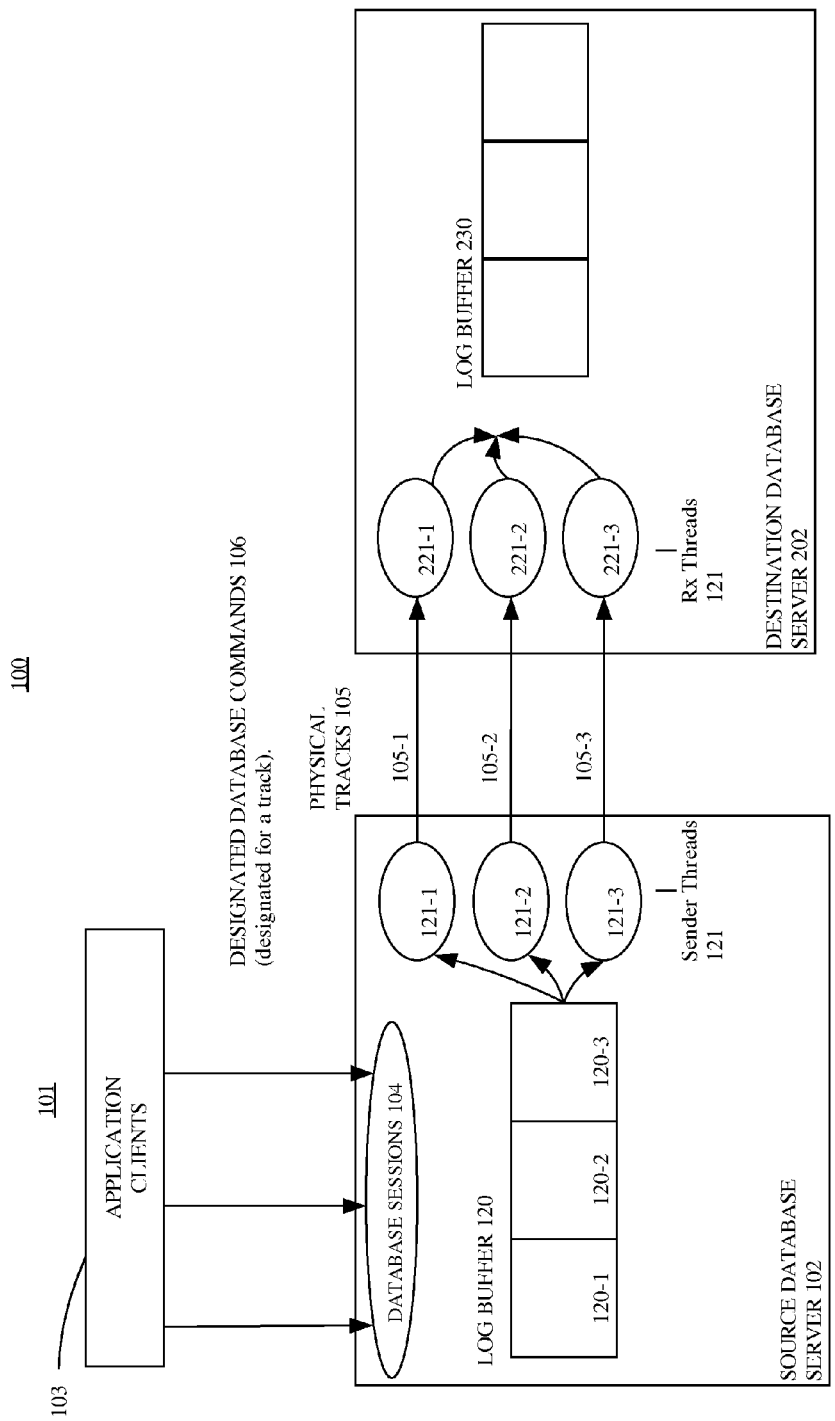
FIG. 1 depicts a database system employing replication tracks according to an embodiment of the present invention.

FIG. 1 is a diagram depicting a database management system that uses track replication for database replication. Referring to FIG. 1. it depicts application clients 103, source database server 102, and destination database server 202. Both source database server 102 and destination database server 202 manage a database (not shown). Clients apps 103 send requests for database changes to source database server 102, which makes the database changes. Changes made by source database server 102 to its database are replicated at the database of destination database server 202.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent or volatile memory mechanism, such as a set of hard disks. Database metadata defines database objects, such as tables, object tables, views, or complex types, such as object types, and functions.

Application clients, such as application clients 103 interact with a database server by submitting to the database server commands that cause the database server to perform operations on data stored in a database. A database command may be in the form of a database statement that conforms to a database language. A language for expressing database requests is the Structured Query Language (SQL). There are many different versions of SQL, some versions are standard and some proprietary, and there are a variety of extensions. Data manipulation language ("DML") statements are issued to a database server to query or request changes to a database. Data definition language ("DDL") instructions are issued to a database server to create or configure database objects, such as tables, views, or complex data types, or to control how DML statements are to be processed.

Generally, data is logically arranged within a database as one or more data containers. Each container contains records, and the data within each record is organized into one or more fields. In relational database management systems, the data containers are typically referred to as tables, the records are referred to as rows, and the fields are referred to as columns.

According to an embodiment, an application client 103 issues database server commands via one session of database sessions 104. A session, such as a database session, is a particular connection established for a client to a server, such as a database instance, through which the client issues a series of requests (e.g., requests for execution of database statements).

For each database session established on a database instance, session state is maintained for the session. Session state includes the data stored for a database session for the duration of the database session. Such data includes, for example, the identity of the client for which the session is established, and temporary variable values generated by processes and database components executing software within the database session.

Designated database commands 106 are DML database commands issued via a database session 104 to source database server 102 within a transaction that is designated for a track. Database changes made by source database server 102 are recorded in log records stored in log buffer 120.

A log record records a change made to database record. For example, a log record may record a change to a row in a database table by a transaction. In an embodiment, a log record is a database redo record or undo record. A redo record records enough information so that a change may be redone to a database while an undo record records enough information about a change so that the change in the database may be undone. According to an embodiment, log buffer 120 serves as a cache in volatile memory where log records are stored before eventually being written to persistent storage.

Physical Tracks

Physical tracks are used to replicate changes made by the transactions assigned to a track. A physical track is an allocation of the resources of a source and destination database server (e.g. CPU time, memory, network connections) that is used to capture source database changes made by the transactions of a track and to replicate the source database changes at a destination database, in a way that preserves transaction dependency between transactions of the track.

FIG. 1 depicts physical transaction tracks 105 according to an embodiment of the present invention. Physical tracks 105 include physical track 105-1, physical track 105-2, and physical track 105-3. Each of physical tracks 105 includes a sender thread 121 and a receiver thread 221. A thread, such as sender thread 121 and receiver thread 221, is a process thread running under control of an operating system.

Each sender thread 121 is connected to a receiver thread 221. Sender thread 121-1 is connected to receiver thread 221-1, sender thread 121-2 is connected to receiver thread 221-2, and sender thread 121-3 is connected to receiver thread 221-3. The connection between a sender thread and receiver thread is preferably, but without limitation, a data communication link suitable for linking separate database servers, such as a network or Infiniband™ connection.

Each physical track 105 replicates changes made at the source database by the transactions assigned to a track. The respective sender thread 121 scans log buffer 120 for changes made by the transactions and transmits the changes via the connection to the respective receiver thread 221, which applies the changes to the database as the destination database. When the changes of transactions assigned to a track are handled by a physical track 105 in these ways, the track or the transactions are referred to as being captured, applied, and/or replicated by the physical track 105.

For the transactions propagated by a physical track 105, the transactions are applied in a manner that accounts for and preserves transactional dependency between the transactions. Examples of such techniques that may be used to preserve transactional dependency are described throughout in Transforming Transactions To Increase Parallelism When Replicating.

When a physical track 105 applies transactions at destination database server 202, the physical track 105 ignores transactional dependency with respect to the transactions being handled by any other of physical tracks 105. This allows each of the physical tracks 105 to process its respective track concurrently with any track replicated by any other of the physical tracks 105.

Designating Tracks for Transactions

As mentioned previously, application clients designate transactions for a track. In an embodiment, tracks are associated with and identified by a track id. An application client may designate a track by specifying a track id of the track.

There are various ways an application client may designate a transaction id of a track; an embodiment of the present invention may use any number of these ways. An application client may specify a track id to associate with a session when logging into a database server. Transactions executed within the session are assigned to that track. During a session for an application client 103, an application client 103 can issue a DDL command to specify a track to associate with a session.

A client application may issue multiple DDL commands that specify different tracks, to switch the track associated with the session. In this way, the track associated with a session may be altered dynamically.

An application client may specify a track for an individual transaction. For example, an application client can send a DDL command to specify (1) to begin a transaction and (2) a track id of a track to which to assign the transaction.

Tracks to Log Strands to Physical Tracks

The number of tracks that can be specified may or may not correspond to the number of physical tracks. User-specified configuration metadata may define the number of physical tracks available, the number of tracks, and the tracks ids assigned to the tracks. To clarify the difference between tracks and physical tracks, tracks may be referred to herein as logical tracks. In addition, user-specified configuration metadata may specify a logical-track-to-physical-track data mapping that maps a logical track to a physical track. In an embodiment, the logical-track-to-physical-track data mapping is determined at run-time by source database server 102 and/or destination database server 202.

The number of physical tracks may be set based on the resources available on the source database servers and destination database servers, and a desired throughput for replicating changes from the source database to the destination database. A desired level of throughput may be achieved with a number of physical tracks that is less than the number of logical tracks.

In an embodiment, the number of logical tracks and number physical tracks are not equal. Multiple logical tracks may be mapped to a single physical track. Thus, the designation of a track for a set of transactions is a guarantee that the set of transactions is replicated in a manner that preserves transactional dependency between the set. However, the designation of the track does not guarantee that the track is replicated without preserving transactional dependency with transactions in other tracks.

The changeable one-to-many relationship between physical tracks and logical tracks allows applications to be programmed and/or configured for a static set of logical tracks. The physical tracks can varied without having to reconfigure the set of logical tracks used by an application. Furthermore, the number of physical tracks, and the degree of parallelism that can be achieved for the physical tracks, can be altered transparently and dynamically to running application clients.

In an embodiment, a log buffer is divided into partitions referred to as strands. Log buffer 120 includes strands 120-1, 120-2, and 120-3. Each strand is read by a single sender thread 121. However, a single sender thread may read multiple strands. Strands in different physical tracks can be read in parallel by sender threads 121-1, 121-2 and 121-3. A mapping maps each strand to a single physical track and each physical track to the one or more corresponding strands. According to an embodiment of the present invention, log records of a transaction may be stored in any strand of the physical track to which the transaction belongs.

Synchronization Point

As mentioned before, transactions executed by a database server are associated with a transaction ordering. The transaction ordering may be based on the order in which the transactions are committed. Such an ordering is referred to as a commit ordering. A transaction committed before another transaction is comparatively earlier in the commit ordering.

A synch point is a position in the commit ordering at which the replication of all transactions of a set of tracks at a destination database must be complete (i.e. committed) before preceding to replicate a transaction at or following the position in the commit ordering. A transaction, referred to as a synch point transaction, may be associated with a synch point; replication of the transaction should be completed at the destination database before beginning to apply any transactions after the synch point in the commit ordering.

For example, source database server 102 receives a DDL command to change a definition of a database object (e.g. add a column, table, etc). The change is to be made in a synch point transaction. The DDL transaction is propagated along a physical track 105. Before the DDL change is applied at destination database server 202, the replication at destination database server 202 of all transactions that precede the respective synch point in the commit order is completed. The DDL transaction is then applied. Next, transactions following the synch point are applied at the destination database by physical tracks 105.

In an embodiment, for any DDL transaction a sync point log record is propagated to all physical tracks. When each respective sender thread 121 reads the sync log record, each ensures all transactions that are previous in the commit order with respect to the sync log record are propagated to the receiver thread and then waits. The DDL transaction is then propagated by one of the sender threads 121, which waits until it receives acknowledgement that the DDL transaction has been applied. Once the notification is received, all the sender threads 121 are notified to begin processing transactions that are later than the DDL transaction according to the commit order.

Various Embodiments

Track replication applies to many types of database servers and many various replication scenarios. In an embodiment, source database server 102 and destination database server 202 are in-memory database servers. In-memory databases are described in related patent applications Automated Integrated High Availability Of The In-Memory and Database Cache and the Backend Enterprise Database. Destination database server 202 is a standby for source database server 102 and therefore during normal real time operations there are no changes on destination database server 202 that are replicated to source database server 102.

In an embodiment, source database server 102 and destination database server 202 are in a peer-to-peer replication relationship. Both of source database server 102 and destination database server 202 execute original transactions that are replicated on the other, that is, transactions originating from one of source database server 102 and destination database server 202 are replicated on the other.

To support the peer-to-peer replication relationship, another set of physical tracks in addition to physical tracks 105 propagate tracks from the destination database server 202 (now also a source database server in this scenario) to source database server 102 (now also a destination database server in this scenario). The other set of physical tracks include transmitter threads running on destination database server 202 that scan log 230 for log of records of transactions and transmit the respective database changes to receiver threads on source database server 102, which apply the changes to the in-memory database of source database server 102.

In another embodiment, transactions propagated from destination database server 202 are propagated via another set of physical tracks to a third database server. The third database server may not be an in-memory database but may instead be a relational/object-relational database server managing a persistent database. Source database server 102 and destination database server 202 serve as an in-memory cache to the relational/object-relational database server, as described in Automated Integrated High Availability Of The In-Memory Database Cache and the Backend Enterprise Database. The other set of physical tracks include transmitter threads at destination database server 202 that read log of records of transactions from log 230 and transmit the respective database changes to a receiver thread on the third database server, which apply the changes to the persistent database.

The present invention is not limited of any particular kind of replication topology or computer system. The replication topology may include database servers running various and mixed kinds of computing elements, including processors running on server blades, personal computers, work stations, and main frames. The database servers may be different kinds of database servers, database servers running software from multiple vendors or even different releases or products from the same vendor.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
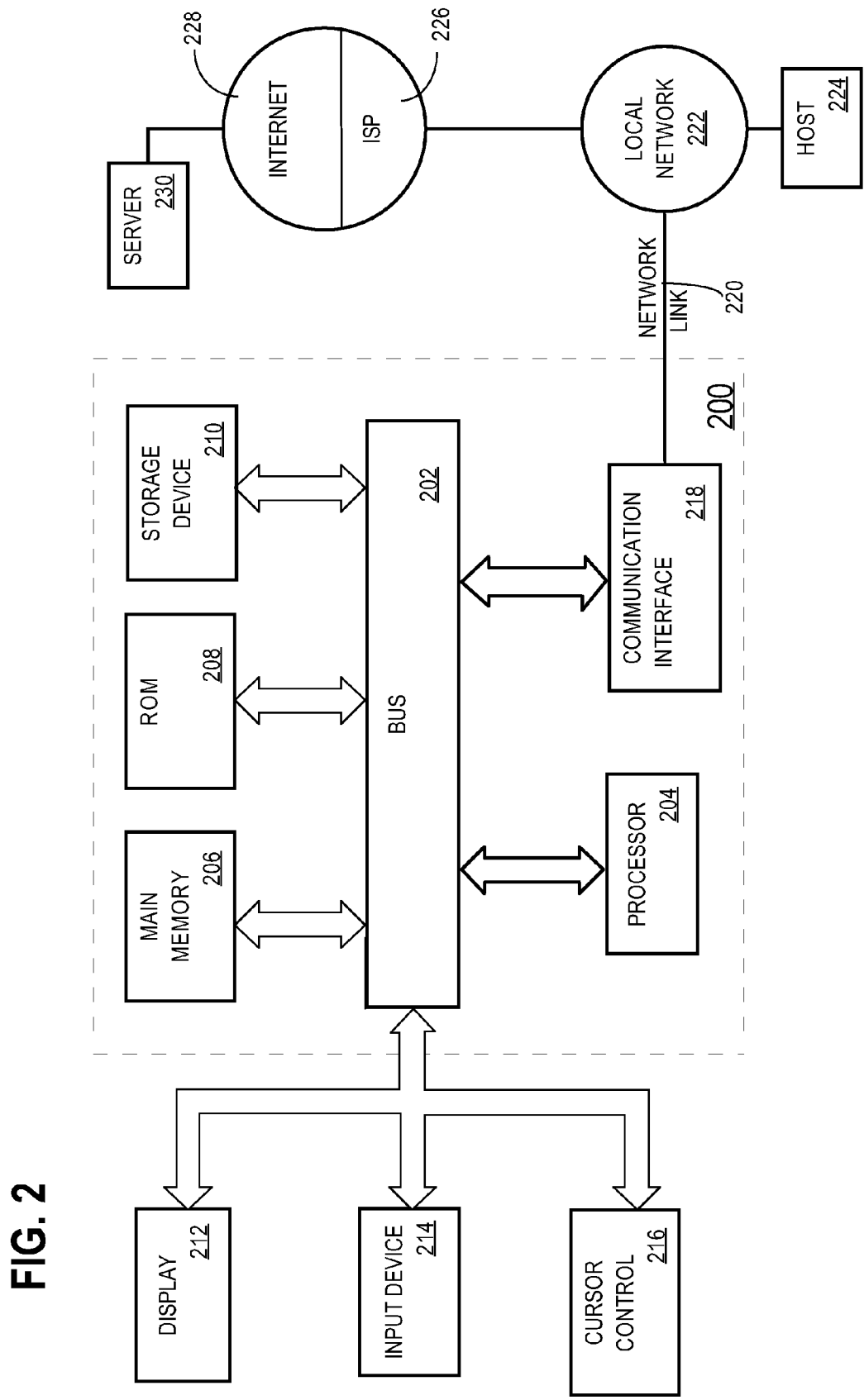
FIG. 2 is a computer system that may be used to implement an embodiment of the present invention.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising steps of:
    a first database server executing a first plurality of transactions, said first plurality of transactions including one or more database changes to a database managed by said first database server, wherein said first plurality of transactions are executed by said first database server in response to requests received by said database server from a set of application clients;
    said first database server assigning each transaction of said first plurality of transactions to a track of a plurality of tracks;
    while said first database server is executing said first plurality of transactions, each track of said plurality of tracks is associated with only one physical track of a plurality of physical tracks;
    for the respective transactions assigned each track of said plurality of tracks, said first database server causing the respective transactions to be replicated at a destination database server via only one physical track of said plurality of physical tracks;
    wherein for each physical track of said plurality of physical tracks, the transactions replicated by said each physical track are:
        replicated at said destination database server in a way that accounts for transactional dependency of any transaction replicated via said each physical track; and
        replicated at said destination database server in a way that ignores transactional dependency of any transaction replicated via any other physical track of said plurality of physical tracks; and
    wherein the method is performed by one or more computing devices.

2. The method of claim 1, wherein the steps further include:
    said first database server receiving from an application client a request to execute a first set of transactions, said request designating a particular track for said first set of transactions; and
    in response to receiving said request, said first database server causing said first set of transactions to be replicated only via the one physical track associated with said particular track.

3. The method of claim 1, wherein the steps further include:
    said first database server associating a database session with a track, said database session connecting said first database server to an application client;
    via said database session, said first database server receiving a request to execute a first set of transactions; and
    based on the said first database server associating said database session with said track, said first database server causing said first set of transactions to be replicated only via the one physical track associated with said track.

4. The method of claim 1, wherein multiple tracks of said plurality of tracks are associated with a certain physical track of said plurality of tracks.

5. The method of claim 1, the steps further including:
said first database server making a determination of a number of physical tracks to use to replicate transactions; and
based on the determination, said first database server mapping said plurality of tracks to said plurality of physical tracks.

6. The method of claim 1, the steps further comprising:
wherein said first plurality of transactions and a synch point are associated with an order, each transaction of said first plurality of transactions being associated with a position in the order before that of the synch point;
wherein a second transaction is associated with a position in the order on or after said synch point; and
said first database server causing said first plurality of transactions to be applied at the destination database server before applying said second transaction.

7. The method of claim 1, wherein said first database server and said destination database server are in-memory database servers.

8. The method of claim 1,
wherein the first database server receives a second plurality of transactions to replicate from said destination database server via a second plurality of physical tracks; and
wherein for each physical track of said second plurality of physical tracks, the transactions replicated by said each physical track are:
replicated at said first database server in a way that accounts for transactional dependency of any transaction replicated via said each physical track; and
replicated at said first database server in a way that ignores transactional dependency of any transaction replicated via any other physical track of said second plurality of physical tracks.

9. A method comprising steps of:
a first database server executing a first plurality of transactions, said first plurality of transactions including one or more database changes to a database managed by said first database server, wherein said first plurality of transactions are executed by said first database server in response to requests received by said first database server from a set of application clients;
said first database server assigning each transaction of said first plurality of transactions to a track of a plurality of tracks;
while said first database server is executing said first plurality of transactions, each track of said plurality of tracks is associated with only one physical track of a first plurality of physical tracks;
for each transaction of said first plurality of transactions, said first database server causing said transactions to be propagated to a destination database server via only one physical track of said first plurality of physical tracks;
for each physical track of said first plurality of physical tracks, for the respective transactions propagated via said each physical track:
said destination database server applies said respective transactions in a way that accounts for transactional dependency of any transaction replicated via said each physical track; and
said destination database server applies said respective transactions in a way that ignores transactional dependency of any transaction replicated via any other physical track of said first plurality of physical tracks; and wherein the method is performed by computing devices.

10. The method of claim 9,
wherein said destination database server propagates said first plurality of transactions to a third database server via a second plurality of physical tracks; and
wherein for each physical track of said second plurality of physical tracks, the transactions replicated by said each physical track are:
replicated at said third database server in a way that accounts for transactional dependency of any transaction replicated via said each physical track; and
replicated at said third database server in a way that ignores transactional dependency of any transaction replicated via any other physical track of said second plurality of physical tracks.

11. A non-transitory computer-readable storage that stores instructions which, when executed by one or more processors, causes the one or more processors to perform steps comprising:
a first database server executing a first plurality of transactions, said first plurality of transactions including one or more database changes to a database managed by said first database server, wherein said first plurality of transactions are executed by said first database server in response to requests received by said database server from a set of application clients;
said first database server assigning each transaction of said first plurality of transactions to a track of a plurality of tracks;
while said first database server is executing said first plurality of transactions, each track of said plurality of tracks is associated with only one physical track of a plurality of physical tracks;
for the respective transactions assigned each track of said plurality of tracks, said first database server causing the respective transactions to be replicated at a destination database server via only one physical track of said plurality of physical tracks; and
wherein for each physical track of said plurality of physical tracks, the transactions replicated by said each physical track are:
replicated at said destination database server in a way that accounts for transactional dependency of any transaction replicated via said each physical track; and
replicated at said destination database server in a way that ignores transactional dependency of any transaction replicated via any other physical track of said plurality of physical tracks.

12. The non-transitory computer-readable storage of claim 11, wherein the steps further include:
said first database server receiving from an application client a request to execute a first set of transactions, said request designating a particular track for said first set of transactions; and
in response to receiving said request, said first database server causing said first set of transactions to be replicated only via the one physical track associated with said particular track.

13. The non-transitory computer-readable storage of claim 11, wherein the steps further include:
said first database server associating a database session with a track, said database session connecting said first database server to an application client;
via said database session, said first database server receiving a request to execute a first set of transactions; and based on the said first database server associating said database session with said track, said first database server causing said first set of transactions to be replicated only via the one physical track associated with said track.

14. The non-transitory computer-readable storage of claim 11, wherein multiple tracks of said plurality of tracks are associated with a certain physical track of said plurality of tracks.

15. The non-transitory computer-readable storage of claim 11, the steps further including:
said first database server making a determination of a number of physical tracks to use to replicate transactions; and
based on the determination, said first database server mapping said plurality of tracks to said plurality of physical tracks.

16. The non-transitory computer-readable storage of claim 11, the steps further comprising:
wherein said first plurality of transactions and a synch point are associated with an order, each transaction of said first plurality of transactions being associated with a position in the order before that of the synch point;
wherein a second transaction is associated with a position in the order on or after said synch point; and
said first database server causing said first plurality of transactions to be applied at the destination database server before applying said second transaction.

17. The non-transitory computer-readable storage of claim 11, wherein said first database server and said destination database server are in-memory database servers.

18. The non-transitory computer-readable storage of claim 11,
wherein the first database server receives a second plurality of transactions to replicate from said destination database server via a second plurality of physical tracks; and
wherein for each physical track of said second plurality of physical tracks, the transactions replicated by said each physical track are:
replicated at said first database server in a way that accounts for transactional dependency of any transaction replicated via said each physical track; and
replicated at said first database server in a way that ignores transactional dependency of any transaction replicated via any other physical track of said second plurality of physical tracks.

19. A non-transitory computer-readable storage that stores instructions which, when executed by one or more processors, causes the one or more processors to perform steps comprising:
a first database server executing a first plurality of transactions, said first plurality of transactions including one or more database changes to a database managed by said first database server, wherein said first plurality of transactions are executed by said first database server in response to requests received by said first database server from a set of application clients;
said first database server assigning each transaction of said first plurality of transactions to a track of a plurality of tracks;
while said first database server is executing said first plurality of transactions, each track of said plurality of tracks is associated with only one physical track of a first plurality of physical tracks;
for each transaction of said first plurality of transactions, said first database server causing said transactions to be propagated to a destination database server via only one physical track of said first plurality of physical tracks;
for each physical track of said first plurality of physical tracks, for the respective transactions propagated via said each physical track:
said destination database server applies said respective transactions in a way that accounts for transactional dependency of any transaction replicated via said each physical track; and
said destination database server applies said respective transactions in a way that ignores transactional dependency of any transaction replicated via any other physical track of said first plurality of physical tracks.

20. The non-transitory computer-readable storage of claim 19,
wherein said destination database server propagates said first plurality of transactions to a third database server via a second plurality of physical tracks; and
wherein for each physical track of said second plurality of physical tracks, the transactions replicated by said each physical track are:
replicated at said third database server in a way that accounts for transactional dependency of any transaction replicated via said each physical track; and
replicated at said third database server in a way that ignores transactional dependency of any transaction replicated via any other physical track of said second plurality of physical tracks.

* * * * *

UNITED STATES PATENT AND TRADEMARK OFFICE
CERTIFICATE OF CORRECTION

PATENT NO.           : 8,738,568 B2
APPLICATION NO.      : 13/101783
DATED                : May 27, 2014
INVENTOR(S)          : Ghosh et al.

Page 1 of 1

It is certified that error appears in the above-identified patent and that said Letters Patent is hereby corrected as shown below:

In the Specification

In column 2, line 30, delete "parallism" and insert -- parallelism --, therefor.

In column 3, line 28, delete "FIG. 1." and insert -- FIG. 1 --, therefor.

In column 6, line 34, delete "preceding" and insert -- proceeding --, therefor.

Signed and Sealed this
Nineteenth Day of May, 2015

Michelle K. Lee
*Director of the United States Patent and Trademark Office*